United States Patent
Yu et al.

(10) Patent No.: US 8,745,645 B2
(45) Date of Patent: Jun. 3, 2014

(54) PORTABLE ELECTRONIC DEVICE

(75) Inventors: Liang Yu, New Taipei (TW);
Pao-Chuan Wang, New Taipei (TW)

(73) Assignee: Wistron Corporation, New Taipei (TW)

(*) Notice: Subject to any disclaimer, the term of this patent is extended or adjusted under 35 U.S.C. 154(b) by 0 days.

(21) Appl. No.: 13/617,115

(22) Filed: Sep. 14, 2012

(65) Prior Publication Data
US 2013/0167165 A1 Jun. 27, 2013

(30) Foreign Application Priority Data
Dec. 26, 2011 (TW) .............................. 100148596 A

(51) Int. Cl.
*G11B 17/03* (2006.01)

(52) U.S. Cl.
USPC ......................................................... 720/601

(58) Field of Classification Search
USPC ............... 369/30.92; 720/601, 602, 604, 614, 720/613, 600; 345/173
See application file for complete search history.

(56) References Cited

U.S. PATENT DOCUMENTS

| | | | |
|---|---|---|---|
| 6,178,084 B1* | 1/2001 | Shibasaki | 361/679.33 |
| 7,659,888 B2* | 2/2010 | Kyouzuka et al. | 345/173 |
| 8,302,112 B2* | 10/2012 | Tsai et al. | 720/602 |
| 2006/0050478 A1 | 3/2006 | Chu et al. | |

FOREIGN PATENT DOCUMENTS

| | | |
|---|---|---|
| TW | 200609922 | 3/2006 |
| TW | I297884 | 6/2008 |
| TW | M417632 | 12/2011 |

OTHER PUBLICATIONS

Office Action issued in Taiwanese Application No. 100148596 dated Feb. 27, 2014 (with partial translation).

* cited by examiner

*Primary Examiner* — Ali Neyzari
(74) *Attorney, Agent, or Firm* — Nixon & Vanderhye, P.C.

(57) ABSTRACT

A portable electronic device for reading a compact disc includes a housing including oppositely spaced-apart first and second inner surfaces, and two oppositely spaced-apart third inner surfaces each connected between the first and second inner surfaces. The first, second and third inner surfaces cooperatively define a passage. A compact disc drive is disposed in the housing and includes a base disposed in the passage, and a tray disposed on and movable relative to the base. The tray has an upper surface for the compact disc to be disposed thereon. The upper surface of the tray is immediately adjacent to and faces the first inner surface of the housing.

4 Claims, 8 Drawing Sheets

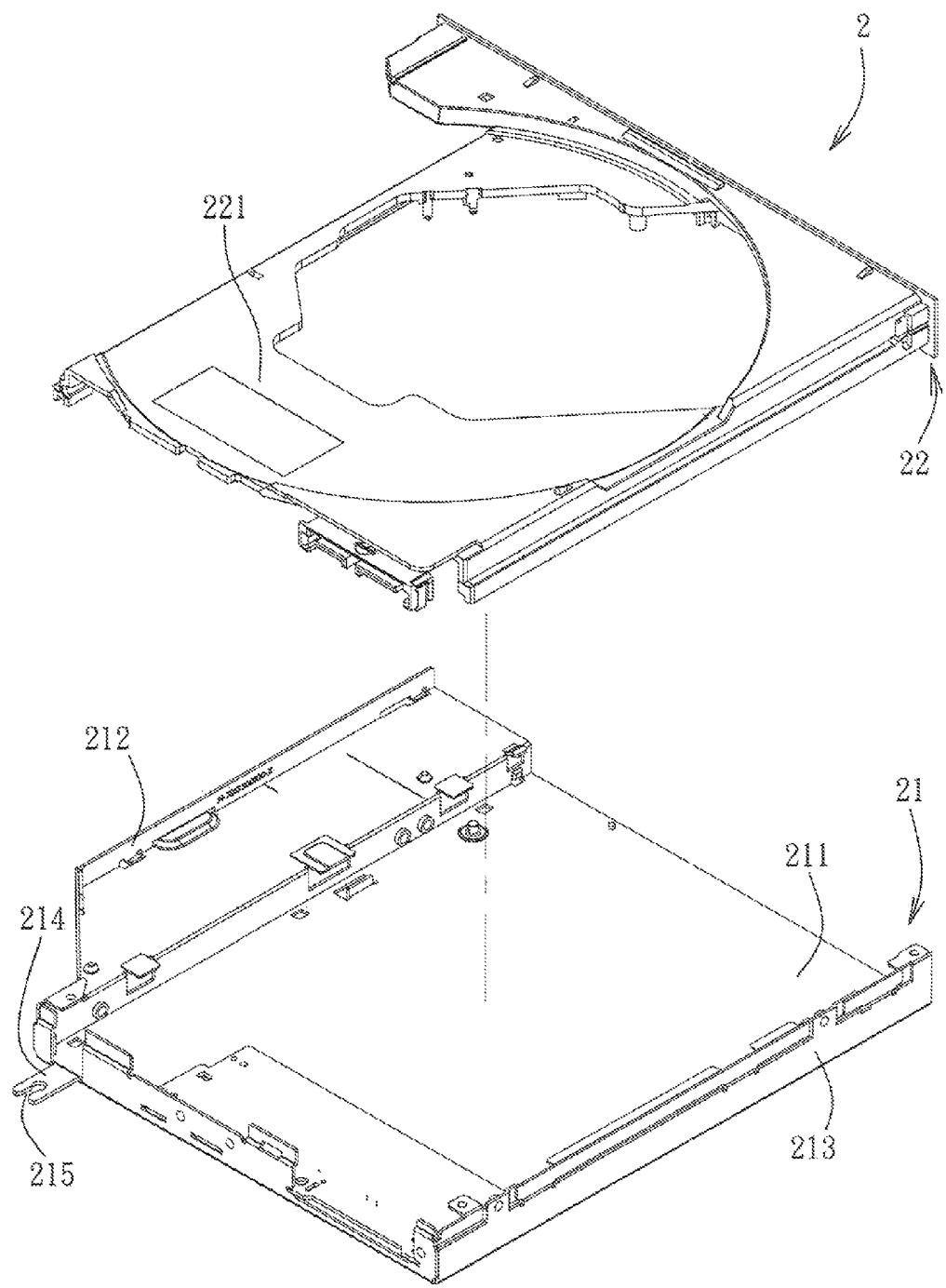
F I G. 5

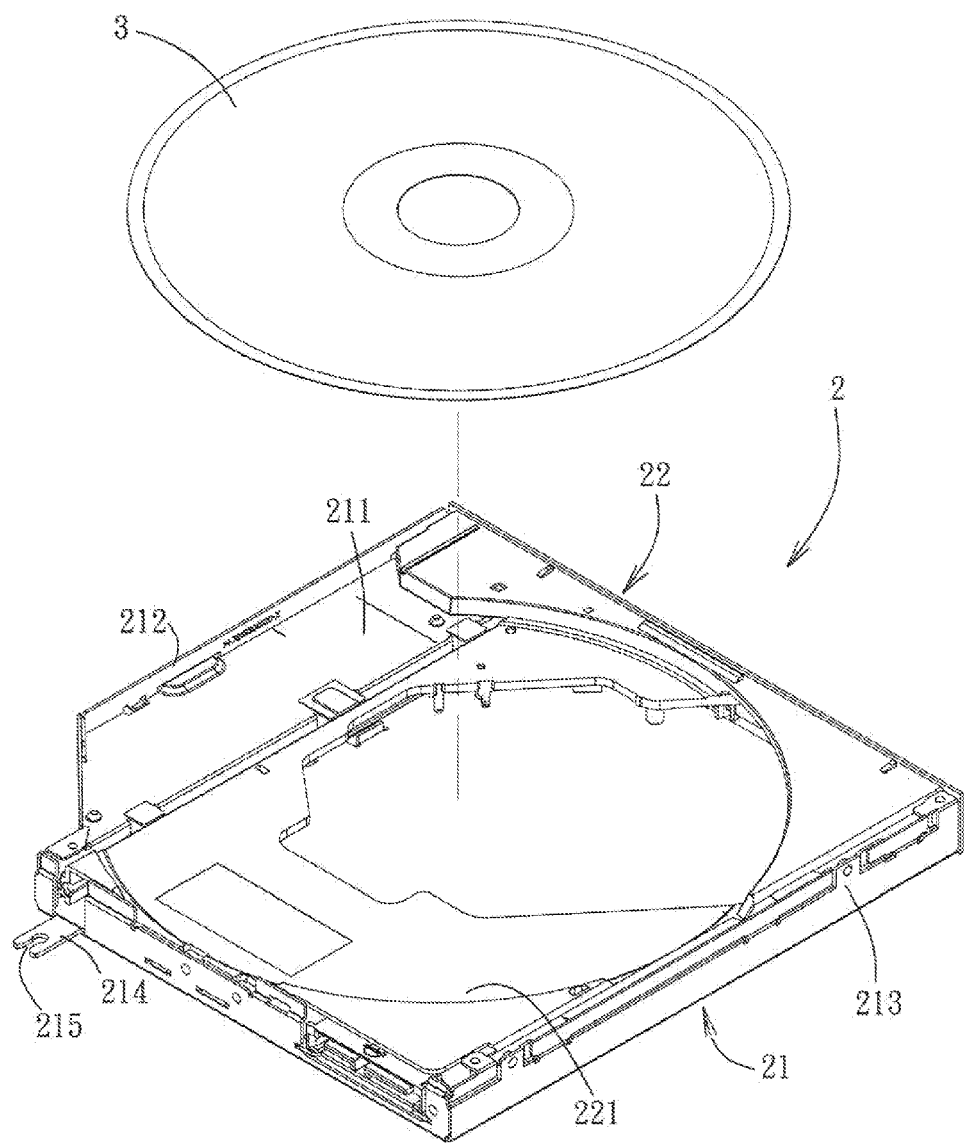
F I G. 6

PORTABLE ELECTRONIC DEVICE

CROSS-REFERENCE TO RELATED APPLICATION

This application claims priority of Taiwanese Application No. 100148596, filed on Dec. 26, 2011, the disclosure of which is incorporated herein by reference.

BACKGROUND OF THE INVENTION

1. Field of the Invention

The invention relates to a portable electronic device, and more particularly to a slim portable electronic device having a compact disc drive.

2. Description of the Related Art

Referring to FIGS. 1 and 2, a compact disc drive 8 of a conventional laptop computer includes a base 81 and a top cover 82 for covering the base 81. The base 81 and the top cover 82 cooperate to define a receiving space for receiving a tray 83. Besides, the base 81 is connected to a securing member 84 that is adapted to be secured to a housing 9 of the conventional laptop computer, so that the compact disc drive 8 can be fixed in the housing 9.

Currently, the development of the laptop computers tends to reduce the thickness thereof. Therefore, how to reduce an overall thickness of the laptop computer through reducing the thickness of the compact disc drive becomes a subject to be further discussed in the present application. In addition, the conventional procedure for securing the compact disc drive 8 to the housing 9 is too complicated. During mounting of the compact disc drive 8 on the housing 9, the securing member 84 has to be secured to the base 81 before being secured on the housing 9. In view of this, how to improve the structure of the securing member 84 of the compact dice drive 8 for simplifying the assembly of the compact disc drive 8 and the housing 9 of the laptop computer has become another subject to be discussed in the present application.

SUMMARY OF THE INVENTION

Therefore, an object of this invention is to provide a slim portable electronic device with a reduced size, while being easy to be assembled with a compact disc drive.

According to the present invention, a portable electronic device for reading a compact disc includes a housing and a compact disc drive. The housing includes oppositely spaced-apart first and second inner surfaces, and two oppositely spaced-apart third inner surfaces each connected between the first and second inner surfaces. The first, second and third inner surfaces cooperatively define a passage. The compact disc drive is disposed in the housing, and includes a base disposed in the passage, and a tray movably disposed on the base. The tray has an upper surface for the compact disc to be disposed thereon. The upper surface of the tray is immediately adjacent to and faces the first inner surface of the housing.

The housing further includes a positioning protrusion, and the compact disc drive further includes an engaging tab formed with an engaging slot corresponding in position to the positioning protrusion. The positioning protrusion engages the engaging slot.

The base includes a bottom plate, a first side plate and a second side plate. The first and the second side plates extend upwardly from the bottom plate. The bottom plate is proximate to the second inner surface of the housing, and the first and second side plates are respectively proximate to the third inner surfaces of the housing.

The positioning protrusion projects from the second inner surface towards the first inner surface.

The engaging tab projects outwardly from the bottom plate, and is indented at one end thereof that is distal from the bottom plate to form the engaging slot.

The effect of this invention resides in reducing the thickness of the compact disc drive and further reducing the overall thickness of the portable electronic device incorporating the same by designing the compact disc drive to exclude a top cover and to have a tray that faces and is immediately adjacent to the first inner surface of the housing of the portable electronic device.

BRIEF DESCRIPTION OF THE DRAWINGS

Other features and advantages of the present invention will become apparent in the following detailed description of the embodiment with reference to the accompanying drawings, of which:

FIG. 5 is an exploded perspective view of a compact disk drive of the embodiment of FIG. 3;

FIG. 6 is the perspective view illustrating how a compact disc is received in the compact disc drive of the embodiment of FIG. 3;

DETAILED DESCRIPTION OF THE PREFERRED EMBODIMENT

Figure 3:
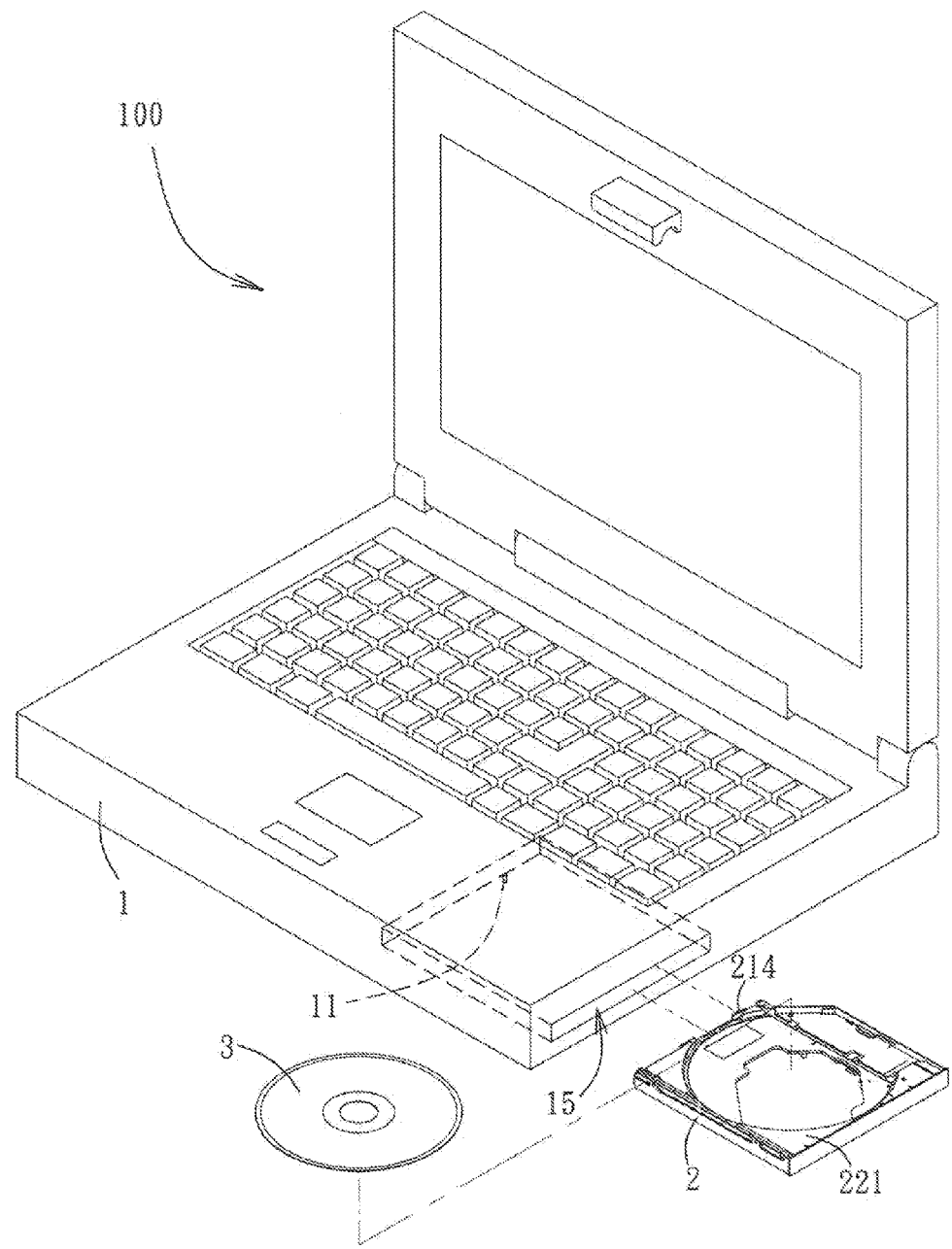
FIG. 3 is an exploded perspective view of a portable electronic device according to the embodiment of the present invention.

Referring to FIG. 3, a portable electronic device 100 according to the embodiment of the present invention is adapted for reading a compact disc 3. The portable electronic device 100 includes a housing 1 and a compact disc drive 2. In this embodiment, the portable electronic device 100 is a laptop computer.

Figure 4:
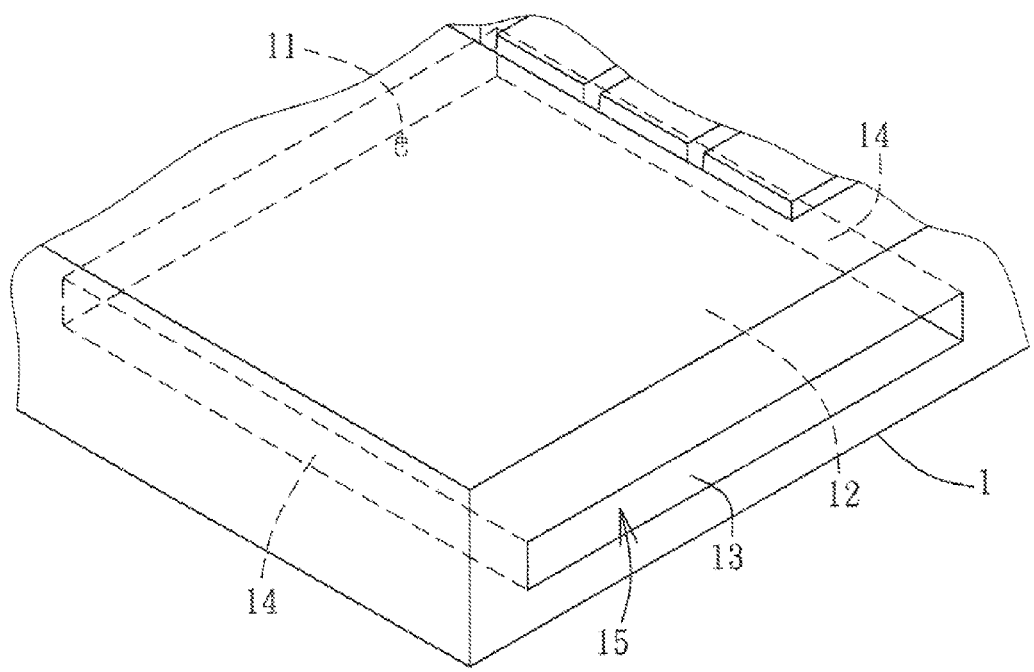
FIG. 4 is a fragmentary perspective view of a housing of the embodiment of FIG. 3.

With reference to FIGS. 3 and 4, the housing 1 includes oppositely spaced-apart a first inner surface and a second inner surface 12, 13, two oppositely spaced-apart third inner surfaces 14 each connected between the first and second inner surfaces 12, 13. The first, second and third inner surfaces 12, 13, 14 cooperatively define a passage 15 for receiving the compact disc drive 2 therein.

The housing 1 further includes a positioning protrusion 11 that extends upwardly from the second inner surface 13, i.e., the positioning protrusion 11 projects from the second inner surface 13 towards the first inner surface 12.

Referring to FIGS. 5 and 6, the compact disc drive 2 is disposed in the housing 1 (shown in FIGS. 3 and 4), and includes a base 21 that is disposed in the passage 15, and a tray 22 that is disposed on and movable relative to the base 21. The base 21 includes a bottom plate 211, and first and second side plates 212, 213 extending upwardly from the bottom plate 211. The bottom plate 211 is proximate to the second inner surface 13 of the housing 1, and the first and second side plates 212, 213 are respectively proximate to the third inner surfaces 14 of the housing 1. The tray 22 has an upper surface 221 for the compact disc 3 to be disposed thereon.

The compact disc drive 2 further includes an engaging tab 214 projecting outwardly from the bottom plate 211. The engaging tab 214 is formed with an engaging slot 215 corresponding in position to the positioning protrusion 11 as shown in FIG. 4. The positioning protrusion 11 engages the engaging slot 215 when the compact disc drive 2 is inserted into the housing 1 through the passage 15. The engaging tab 214 is indented at one and thereof that is distal from the bottom plate 211 to form the engaging slot 215.

Figure 7:
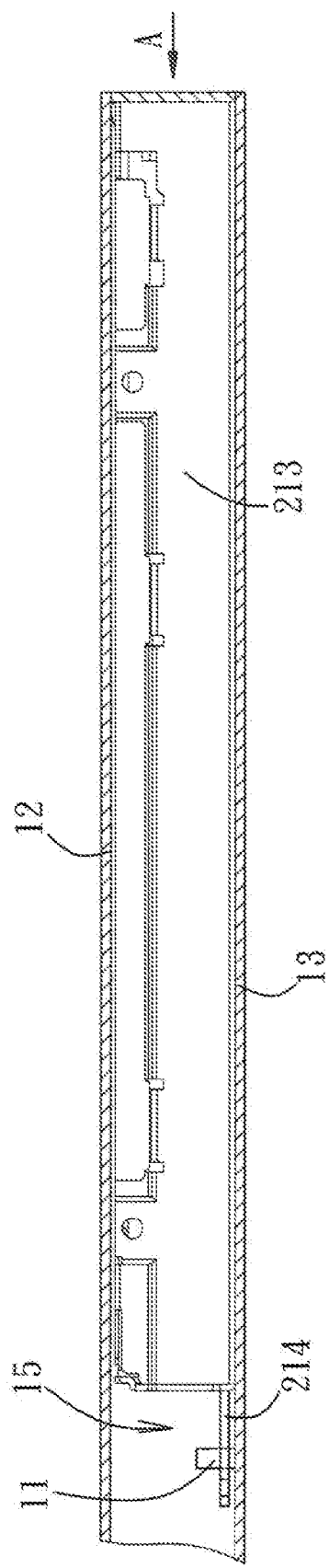
FIG. 7 is a fragmentary sectional view of the embodiment of FIG. 3 in an assembled state.
Figure 8:
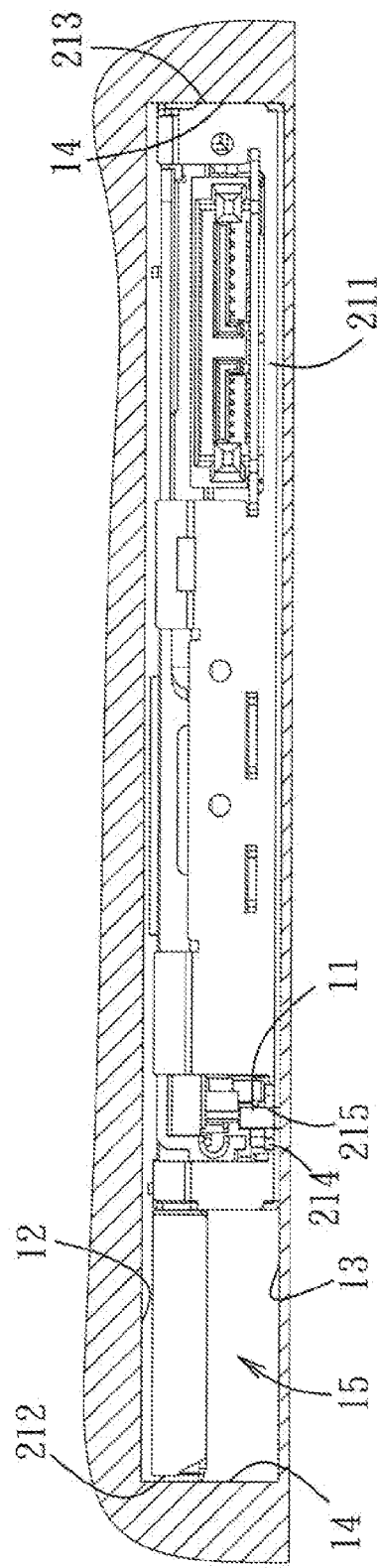
FIG. 8 is a fragmentary sectional view of the embodiment of FIG. 3 in the assembled state taken from another viewing angle.

With reference to FIGS. 3, 7 and 8, to assemble the portable electronic device 100, the engaging tab 214 of the compact disc drive 2 is first aligned with the positioning protrusion 11 of the housing 1 and then the compact disc drive 2 is inserted into the housing 1 and moved along the passage 15 in a direction indicated by arrow (A) until the positioning protrusion 11 engages the engaging slot 215 in the engaging tab 214, at which time the assembly of the compact disc drive 2 in the housing 1 is completed. After the compact disc drive 2 is assembled in the housing 1, the bottom plate 211 of the base 21 is proximate to the second inner surface 13 of the housing 1, and the first and second side plates 212, 213 of the base 21 are respectively proximate to the third inner surfaces 14 of the housing 1. The upper surface 221 of the tray 22 faces and is immediately adjacent to the first inner surface 12 of the housing 1.

Figure 1:
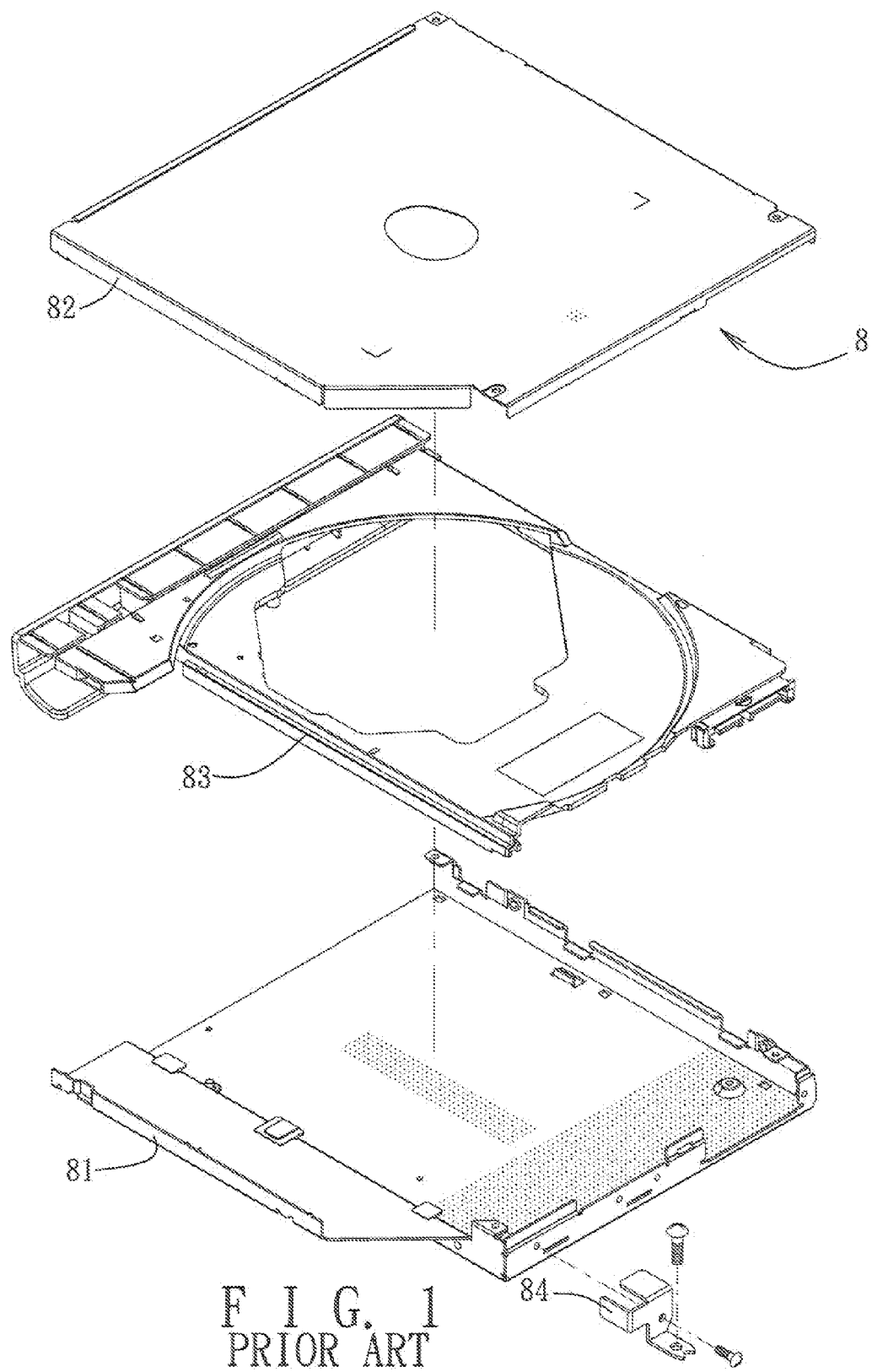
FIG. 1 is an exploded perspective view of a conventional compact disc drive.
Figure 2:
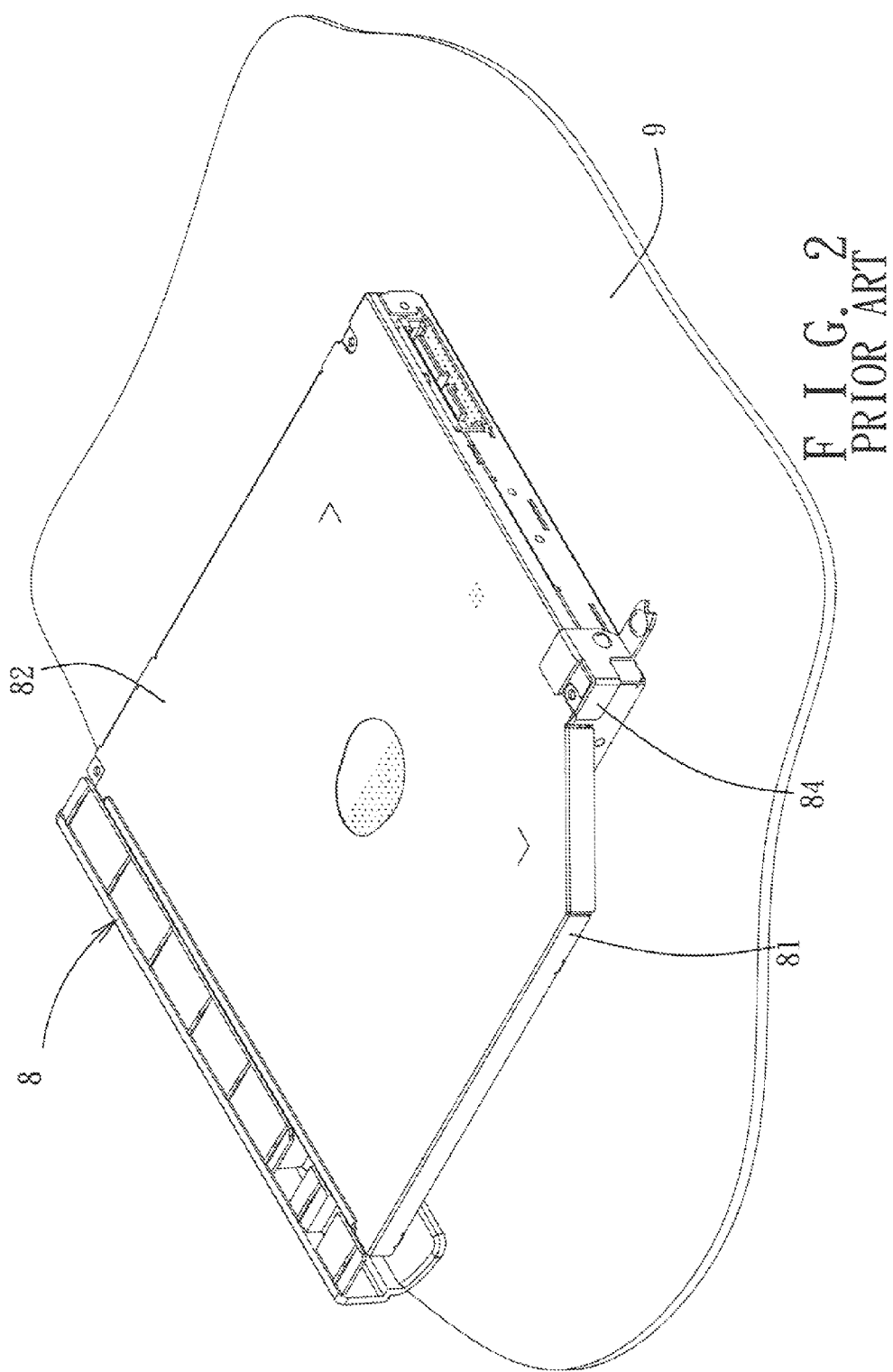
FIG. 2 is a perspective view of the conventional compact disc drive of FIG. 1 assembled in a conventional laptop computer.

To sum up, according to the structural configuration of the portable electronic device 100 of this invention, since there is no element (e.g., the conventional top cover 82 shown in FIG. 1) interposed between the upper surface 221 of the tray 22 and the first inner surface 12 of the housing 1, i.e., the upper surface 221 directly faces the first inner surface 12, the upper surface 221 of the tray 22 is much closer to the first inner surface 12 of the housing 1 than that of the prior art, thereby reducing the thickness ox the housing 1. Therefore, the overall thickness of the portable electronic device 100 is reduced. Moreover, through the design of the cooperating engaging slot 215 and positioning protrusion 11, the fastening means for securing the compact disc drive 2 to the housing 1 can be simplified, thereby effectively reducing assembly cost of the portable electronic device 100.

While the present invention has been described in connection with what is considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A portable electronic device for reading a compact disc, comprising:
 a housing including oppositely spaced-apart first and second inner surfaces, and two oppositely spaced-apart third inner surfaces each connected between said first and second inner surfaces, said first, second and third inner surfaces cooperatively defining a passage; and
 a compact disc drive disposed in said housing and including a base that is disposed in said passage, and a tray that is disposed on and movable relative to said base, said tray having an upper surface for the compact disc to be disposed thereon, said upper surface of said tray being immediately adjacent to and facing said first inner surface of said housing;
 wherein said housing further includes a positioning protrusion, said compact disc drive further including an engaging tab formed with an engaging slot that corresponds in position to said positioning protrusion, said positioning protrusion engaging said engaging slot.

2. The portable electronic device as claimed in claim 1, wherein said base includes a bottom plate, and first and second side plates extending upwardly from said bottom plate, said bottom plate being proximate to said second inner surface of said housing, said first and second side plates being respectively proximate to said third inner surfaces of said housing.

3. The portable electronic device as claimed in claim 2, wherein said positioning protrusion projects from said second inner surface towards said first inner surface.

4. The portable electronic device as claimed in claim 3, wherein said engaging tab projects outwardly from said bottom plate, said engaging tab being indented at one end thereof that is distal from said bottom plate to form said engaging slot.

\* \* \* \* \*